ENVELOPE DELAY SCANNING SYSTEM
Filed Oct. 4, 1950
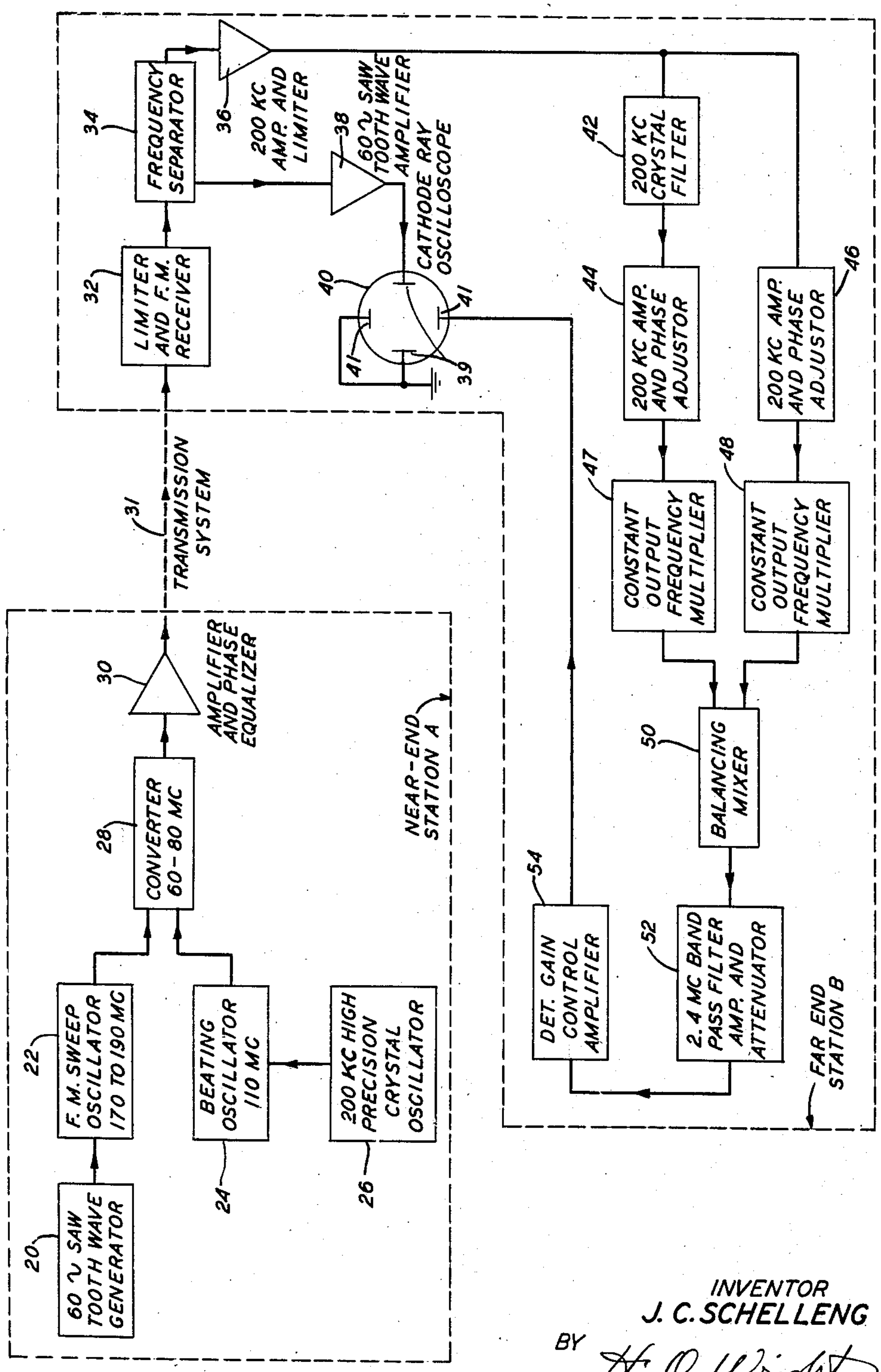
INVENTOR
J. C. SCHELLENG
BY H. O. Wright
ATTORNEY Patented Jan. 13, 1953

2,625,614

UNITED STATES PATENT OFFICE 2,625,614

ENVELOPE DELAY SCANNING SYSTEM

John C. Schelleng, Interlaken, N. J., assignor to Bell Telephone Laboratories, Incorporated, New York, N. Y., a corporation of New York Application October 4, 1950, Serial No. 188,285

3 Claims. (Cl. 179—175.3)

This invention relates to envelope delay scanning systems which comprise delay distortion measuring systems adapted and arranged to display instantaneously the envelope delay versus frequency characteristics of complex high frequency electrical apparatus and communication systems. More particularly it relates to a method and apparatus especially adapted for providing instantaneous displays of the envelope delay versus frequency characteristics of physically and electrically long high frequency communication transmission systems wherein the reference signal is derived directly from the transmitted test signals and the necessity for an additional circuit to transmit a suitable reference signal from the near end station to the far end station of the system under test is eliminated.

A principal object of the invention is, accordingly, to provide a method and apparatus for deriving directly from the testing signals, at the far end station of a long high frequency communication system, a suitable reference signal for use in providing instantaneous envelope delay versus frequency characteristics of the over-all system.

Other and further objects and features of the invention will become apparent during the course of the following detailed description and from the appended claims.

The principles of the invention will be more readily perceived in connection with the following description of a preferred illustrative embodiment of the invention and from the accompanying drawing, in which the figure shows, in block schematic diagram form, a system for measuring the delay distortion of a high frequency communication transmission system, which measuring system embodies in one illustrative form the principles of the invention.

In more detail in the figure, a frequency-modulated sweep oscillator 22 is periodically swept through a predetermined frequency range such, for example, as the range between 170 megacycles to 190 megacycles, inclusive, by means of a voltage control wave which can, for example, be of saw-tooth form and be supplied by a saw-tooth wave generator 20. The control wave can, for example, have a repetition rate of 60 cycles per second.

Oscillator 22 can, for example, be of the type employing the well-known "velocity variation" type of vacuum tube in which the frequency of the oscillator can be readily swept through a frequency range, such as is mentioned above by way of example, by simply varying the voltage applied to the repeller anode of the tube over a suitable range of voltages.

Alternatively the desired frequency sweep of oscillator 22 can be effected by applying the saw-tooth wave from generator 20 to a reactance tube connected into the frequency determining or tuning circuit of oscillator 22, in accordance with principles well understood by those skilled in the art.

Saw-tooth wave generator 20 can, likewise, be of any of the numerous types well known to the art and its frequency of repetition can, in the majority of the types well known to those skilled in the art, be varied over a wide range, as, for example, between 25 and 100 cycles per second, if so desired. A reliably stable frequency of 60 cycles (or a frequency harmonically related to 60 cycles) is generally available from a commercial power supply and, therefore, usually can conveniently be used to synchronize the action of the saw-tooth wave generating circuit and for similar purposes.

Since the range of frequencies between 60 and 80 megacycles, inclusive, is convenient for use in transmitting communication signals such as video television signals or multi-channel carrier telephone or carrier telegraph signals, or the like, a beating oscillator 24 is employed in the figure and its output, having a frequency of 110 megacycles, is introduced together with the output of oscillator 22 into converter 28, which, by combining the two inputs, provides an output which is varied regularly, or cyclically, under control of the wave from generator 20, over the range of 60 to 80 megacycles, inclusive. Numerous appropriate types of beating oscillators for such use are well known to those skilled in the art.

To provide a suitable reference signal, and, as well, a test signal to which will be imparted, during transmission through the system, the phase variations which it is desired to measure, the 110-megacycle frequency of beating oscillator 24 is itself modulated by the 200-kilocycle output of a high precision constant frequency crystal oscillator 26, before being combined in converter 28 with the output of sweep amplifier 22.

If the system under test is a transmission circuit extending over many miles (circuits of the type contemplated, with which the arrangements of the invention are to be used, have been operated between terminals over a thousand miles apart and longer circuits will undoubtedly soon be constructed) the absolute delay is very great but its variations with frequency are comparatively small. In order to carry out the phase comparison with sufficient accuracy to measure these small variations of delay time, the frequency of the 200-kilocycle modulating signal or "testing signal" must remain extremely constant. For this reason a highly stable crystal oscillator which can be of any of the several types well known in the art, is chosen as the source of the 200-kilocycle signal. The 200-kilocycle modulation introduced by oscillator 26 will, of course, appear as a modulation of the 60 to 80 megacycle output of converter 28.

In accordance with the usual practice in the art, the output of converter 28 is further amplified and predetermined phase adjustments, calculated to compensate for the average phase distortion of the system, are effected by amplifier and phase equalizer 30, the output of which is introduced into the near end of transmission system 31. Numerous suitable amplifying and phase equalizing units are well known and have been used extensively in the art.

The above-described units comprise the apparatus at the near end or transmitting end of the system and are enclosed in a dash-line and designated collectively as "Near End Station A."

Transmission system 31 can be, for example, a high frequency radio transmission system of the type shown schematically in Fig. II–1 at page 199 of the article entitled "Microwave repeater research" by H. T. Friis, published in the Bell System Technical Journal Vol. 27, No. 2 for April, 1948. The "transmission system" can, and usually if "long" will, include a substantial number of repeater stations, the functions of which repeater stations, as is well understood by those skilled in the art, are to raise the level (i. e. to amplify) the transmitted waves at each repeater station to compensate for the attenuation of the "line" or radio transmission path between stations and also, if desired, to introduce equalization of amplitude and phase distortion introduced by the line or path and the station apparatus. Similar systems, employing coaxial cable, wave guide, or other types of transmission lines to interconnect successive terminal and repeater stations can also, of course, be tested in accordance with the principles of the present invention.

A typical microwave radio transmission system employing a plurality of repeater stations, intermediate the near end and the far end terminal stations of the system, is that described in the above-mentioned article by H. T. Friis in the Bell System Technical Journal in which details of the major component apparatus assemblies are also given. The system is also illustrated and described in an article entitled "N. Y.-Boston microwave television relay" in the magazine "Electronics" for January 1948, beginning at page 114. For purposes of transmission by radio and, indeed, even through a wave guide transmission line, the 60 to 80 megacycle signal from amplifier 30, station A, the figure of the drawing of this application, is, preferably, employed to modulate a very much higher frequency carrier, which can be, for example, in the neighborhood of 4000 megacycles for transmission over radio links, as described in the above-mentioned "Electronics" article. The techniques required to effect such additional modulation are well known to those skilled in the art and are generally similar to those described in the above-mentioned Bell System Technical Journal and the "Electronics" articles. In general the radio system or other type of transmission system to be tested will be arranged to accept the signal from amplifier 30 at its near end and to demodulate it back to substantially its initial character at the far end of the system. It is, of course, also entirely practicable to transmit the 60 to 80 megacycle signal directly by radio system, coaxial line system or wave guide system without further modulating or demodulating processes.

Of interest, in connection with this application, as representing certain prior art delay distortion measuring methods and systems, is an article entitled "The measurement of delay distortion in microwave repeaters" by D. H. Ring appearing at page 247 in the same volume and number of the Bell System Technical Journal (April 1948) as the above-mentioned article by H. T. Friis.

At the far end station B, of the figure, the 60 to 80 megacycle signal arrives over transmission system 31 and is applied, after demodulation, if a higher frequency carrier has been used, to frequency modulation receiver 32. The 60 to 80 megacycle signal is demodulated by receiver 32 and its output is connected to frequency separator 34 which can, for example, comprise a combination of a low pass filter suppressing frequency above about 5000 cycles and a band-pass filter passing 200 kilocycles and sideband frequencies on each side of the 200-kilocycle carrier, the band passed being typically 10 kilocycles wide and being centered about 200 kilocycles.

As mentioned above, should the transmission system 31 be of a type employing a very high frequency carrier, the far end receiving apparatus of the transmission system will, normally, be arranged to demodulate the input to obtain the 60 to 80 megacycle wave, for presentation to receiver 32, as described in the above-mentioned "Electronics" and Bell System Technical Journal articles.

The filters of frequency separator 34, for the above-described purposes, can take any of the numerous forms well known to those skilled in the electrical wave filter art.

The 60-cycle saw-tooth wave will pass through the low pass filter portion of separator 34 and be amplified in saw-tooth wave amplifier 38 to a suitable amplitude to be employed as the sweep wave for cathode-ray oscilloscope 40, the output of amplifier 38 being impressed across the horizontal deflecting plates 39 of said oscilloscope, as shown. This obviously provides a frequency scale which is independent of the path (or transmission system) length.

The 200-kilocycle signal and its sideband frequencies are passed by the band-pass portion of frequency separator 34 to a conventional amplifier and limiter 36, where they are suitably amplified and limited to remove unwanted amplitude modulation.

The output of device 36 is divided between the two circuits, as shown in the figure, which comprise for the first circuit, a very narrow band crystal filter 42 passing only the single frequency of 200 kilocycles and effectively eliminating all sideband frequencies (200 kilocycles ±60 cycles per second and 200 kilocycles ± harmonics of 60 cycles) adjacent to 200 kilocycles, a 200-kilocycle amplifier and phase adjuster 44 and a constant output frequency multiplier 47; and for the other circuit only a 200-kilocycle amplifier and phase adjuster 46 and a constant output frequency multiplier 48. Since the phase variations to be measured are small and noise or amplitude variations may be of troublesome magnitudes, greater accuracy can be obtained, in accordance with principles well known in the art, by multiplying the comparison or reference and the signal frequencies by the same ratio, in the instant example, by a factor of 12, prior to measurement of the phase variations.

Filter 42 can be of the type employing piezoelectric crystals, well known to those skilled in the art.

Devices 44 and 46 should introduce substantially no delay distortion over their respective signal frequency ranges. They can otherwise be of any of the several types well known in the art.

Devices 47 and 48 should be adjusted to be substantially identical and should introduce no delay distortion over the frequency ranges being passed by them. They can be of any of the conventional types well known in the art.

The output of the filter 42, namely the 200-kilocycle frequency, "stripped" of its sideband frequencies, is substantially a replica of the frequency output of precision oscillator 26 employed at the near end station A to modulate the output wave of beating oscillator 24 and can be used as a reference, standard or comparison frequency, as will presently be described.

Amplifiers and phase shifters 44 and 46 serve to suitably amplify their respective input signals, and to bring them into suitable phase relation for "vector-difference" measurements, the input to device 44 being the pure 200-kilocycle signal and the input to device 46 being the 200-kilocycle frequency with its sidebands. The latter component contains variations of instantaneous phase which are proportional to the variations in delay encountered at the radio frequency existing at that moment of the radio frequency sweep. Looked at from the viewpoint of the radio frequency spectrum, this says merely that whatever wave is being borne over the circuit as a modulation will suffer different delays depending on the momentary frequency of the radio wave acting as a carrier; looked at from the point of view of the 200-kilocycle modulating wave, it means that its instantaneous phase is modulated by this delay which changes cyclically with the sweep, and that any properly designed phase-modulation demodulator would permit the delineation of the variation through the sweep cycle.

Accordingly, the delay distortion of the complete system is found by comparing the instantaneous phase of the 200-kilocycle signal with that of the above noted reference signal comprising the 200-kilocycle carrier "stripped" of its sidebands by being passed through the very narrow band filter 42.

Facilities for phase adjustment are provided in devices 44 and 46 so that comparison of the 200-kilocycle frequency together with its sidebands with the "stripped" 200-kilocycle frequency can be effected by the well-known "phase opposition" method. This method of measurement is effected in the balancing mixer 50, the output of which, comprising signals representing phase versus frequency variations of the complete circuit over the 20-megacycle band, is first passed through a band-pass filter, amplifier and attenuator 52, wherein frequencies other than those of substantially 2.4 megacycles are eliminated. The remaining signals are then detected and adjusted in amplitude in detector amplifier 54 to an appropriate average value, for display as vertical deflections on cathode-ray oscilloscope 40. The curve then traced by the beam of oscilloscope 40 will represent the instant envelope delay of the transmission system 31 over the range of 60 to 80 megacycles. Since the scanning rate is 60 times per second, any substantial variations in the envelope delay with time are immediately apparent.

That portion of the circuit of the far end station B, comprising apparatus units 42, 44, 46, 47, 48 and 50, described above, is, in effect, a circuit which converts phase variations into amplitude variations.

The system of Fig. 1 is obviously readily adaptable to the measurement of the envelope delay of apparatus other than transmission systems, such, for example, as an equalizer whose envelope delay it is desired to adjust to compensate for the delay of a portion or all of a transmission system. Comparison of a piece of equipment to be measured, with a standard piece of equipment known to have a certain desired characteristic is also readily effected by a circuit of the invention such as that shown in Fig. 1 and described above, since it is only necessary to provide two simple two-position switches, one on the output of amplifier-equalizer 30 and the other on the input to receiver 32 and to alternately connect the standard and the equipment to be measured between said amplifier 30 and receiver 32. Comparison of the oscilloscope traces obtained for the two switch positions then obviously shows any deviations of the apparatus being tested from the characteristic of the standard.

As a refinement of this latter arrangement the switching can be readily synchronized with the wave of the saw-tooth wave generator 20 so that two overlapping traces, one of the standard, the other of the equipment to be measured, are obtained simultaneously on the oscilloscope.

Where the apparatus of the "far end station" is in fact not far distant from the near end station, the reference or standard 200-kilocycle signal can be taken directly from oscillator 26 to amplifier and phase adjuster 44, rather than being derived from the output of amplifier and limiter 36, in which case filter 42 is not needed.

Those skilled in the art will readily perceive that numerous and varied applications of the principles of the invention can be made without departing from the spirit and scope thereof.

What is claimed is:

1. In an envelope delay scanning system for testing a transmission system, means for deriving a carrier whose frequency is modulated by a first signal so as to sweep over the band of frequencies normally transmitted over said transmission system, means for additionally modulating said carrier by a second highly stable single frequency signal, means for introducing said doubly modulated carrier into the input end of said transmission system, means for deriving said doubly modulated carrier at the output end of said transmission system, demodulating means for recovering said first signal and said second signal, a first frequency selective means to isolate from said first signal a signal representing the sweep cycle, a second frequency selective means to isolate frequencies representing said second signal and sideband frequencies of said second signal representative of the phase variations encountered in passing through said system, a third frequency selective means to strip said sideband frequencies from said selected second signal, means for comparing the phases of the stripped selected second signal with those of the selected second signal with said sideband frequencies present, and obtaining a third signal indicative of the phase variations represented by said sideband frequencies, a cathode-ray oscilloscope having horizontal and vertical deflecting means, means for impressing said recovered sweep cycle signal on said horizontal deflecting means and means for impressing said third signal on said vertical deflecting means whereby an indication of the envelope delay characteristic of said transmission system is obtained on the screen of said cathode-ray oscilloscope.

2. The envelope delay scanning system of claim 1 and means for multiplying the frequency of said stripped selected second signal and of said selected second signal with said sideband frequencies present, prior to comparing the phases of said signals, whereby increased accuracy of phase measurement is realized.

3. In an envelope delay scanning system, including a near end station and a far end station and adapted to measure very long electrical communication transmission systems transmitting a broad band of frequencies, means at said near end station for generating a frequency modulated signal, the modulation of which is varied in a regular manner over the said broad band of frequencies, means at said near end station for generating a second single-frequency signal the frequency of which is very small with respect to said broad band of frequencies, means at said near end station for modulating said frequency modulated signal with said single frequency, means for transmitting said doubly modulated signals over said long transmission system to said far end station, frequency selective means at said far end station for isolating from the detected output of said transmission system the said single frequency signal and its sideband frequencies and further frequency selective means for isolating said single frequency from its sideband frequencies whereby a reference frequency suitable for phase comparison with said single frequency accompanied by its sideband frequencies is obtained at said far end station and the necessity of transmitting a suitable reference frequency over a separate circuit between said near end and said far end stations is eliminated.

JOHN C. SCHELLENG.

REFERENCES CITED

The following references are of record in the file of this patent:

UNITED STATES PATENTS

| Number | Name | Date |
|---|---|---|
| 2,347,398 | Crosby | Apr. 25, 1944 |
| 2,364,190 | Burgess | Dec. 5, 1944 |
| 2,447,233 | Chatterjea et al. | Aug. 17, 1948 |
| 2,465,355 | Cook | Mar. 29, 1949 |
| 2,471,530 | Lobel | May 31, 1949 |
| 2,534,957 | Delvaux | Dec. 19, 1950 |

FOREIGN PATENTS

| Number | Country | Date |
|---|---|---|
| 105,699 | Australia | Nov. 1, 1938 |